United States Patent [19]

Takizawa et al.

[11] Patent Number: 4,679,326
[45] Date of Patent: Jul. 14, 1987

[54] HEIGHT GAUGE

[75] Inventors: Kinji Takizawa; Ichiro Mizuno; Iwao Sugizaki, all of Kawasaki, Japan

[73] Assignee: Mitutoyo Mfg. Co., Ltd., Tokyo, Japan

[21] Appl. No.: 798,523

[22] Filed: Nov. 15, 1985

[30] Foreign Application Priority Data

Nov. 21, 1984 [JP] Japan .................... 59-246552
Nov. 21, 1984 [JP] Japan .................... 59-177050[U]

[51] Int. Cl.⁴ .............................................. G01B 5/02
[52] U.S. Cl. .................................... 33/170; 33/172 E; 74/625; 192/48.91
[58] Field of Search .............. 33/169 R, 170, 171, 33/172 E; 192/48.91, 96, 70.19; 74/625

[56] References Cited

U.S. PATENT DOCUMENTS

| 858,651 | 7/1907 | Griffith | 74/625 |
| 2,545,881 | 3/1951 | Graham | 33/171 |
| 3,289,310 | 12/1966 | Stone | 33/170 |
| 3,515,250 | 6/1970 | Cantalupo | 74/625 |
| 3,811,192 | 5/1974 | Christensen | 33/170 |
| 3,895,356 | 7/1975 | Kraus | 33/172 E |
| 3,924,337 | 7/1984 | Taylor | 33/169 R |
| 3,996,669 | 12/1976 | Anichini | 33/172 E |
| 4,458,423 | 7/1984 | Sakata et al. | 33/169 R |
| 4,459,755 | 7/1984 | Gruhler | 33/169 R |

FOREIGN PATENT DOCUMENTS

| 1301321 | 12/1972 | United Kingdom . |
| 1449259 | 9/1976 | United Kingdom . |
| 1498711 | 1/1978 | United Kingdom . |
| 2102125A | 1/1983 | United Kingdom . |
| 2106251A | 4/1983 | United Kingdom . |
| 2110371A | 6/1983 | United Kingdom . |
| 2128742A | 5/1984 | United Kingdom . |

Primary Examiner—Charles Frankfort
Assistant Examiner—Patrick Scanlon
Attorney, Agent, or Firm—Flynn, Thiel, Boutell & Tanis

[57] ABSTRACT

A height gauge has a touch signal probe provided on a slider vertically movably supported on a support for the purpose of measuring the dimensions or the like of an object by bringing the probe into contact with the object. A rack is formed on the support, and a driving shaft is disposed on the slider, the driving shaft having a pinion engaged with the rack. To the driving shaft are secured a pulley to which the turning force from a motor is transmitted and a control wheel for manually rotating the driving shaft. A clutch member is interposed between the pulley and the control wheel. When the clutch member is engaged with the pulley, the slider is automatically moved up and down, while when the clutch member is engaged with the control wheel, the slider can be manually moved up and down. The height gauge further includes a control circuit which stops the drive of the motor when the touch signal probe generates a touch signal and which holds the indication of a measured value being displayed at that time.

12 Claims, 8 Drawing Figures

FIG.6
FIG.7
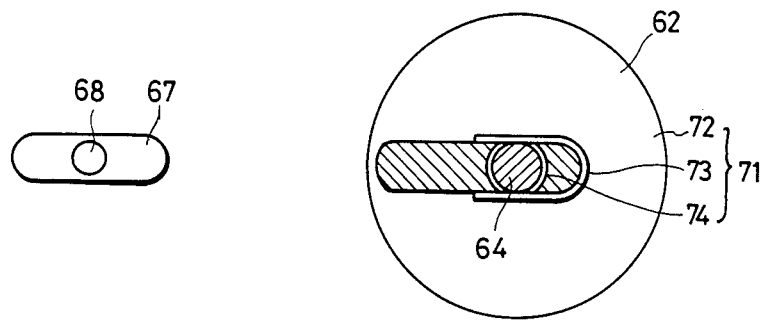
FIG.8
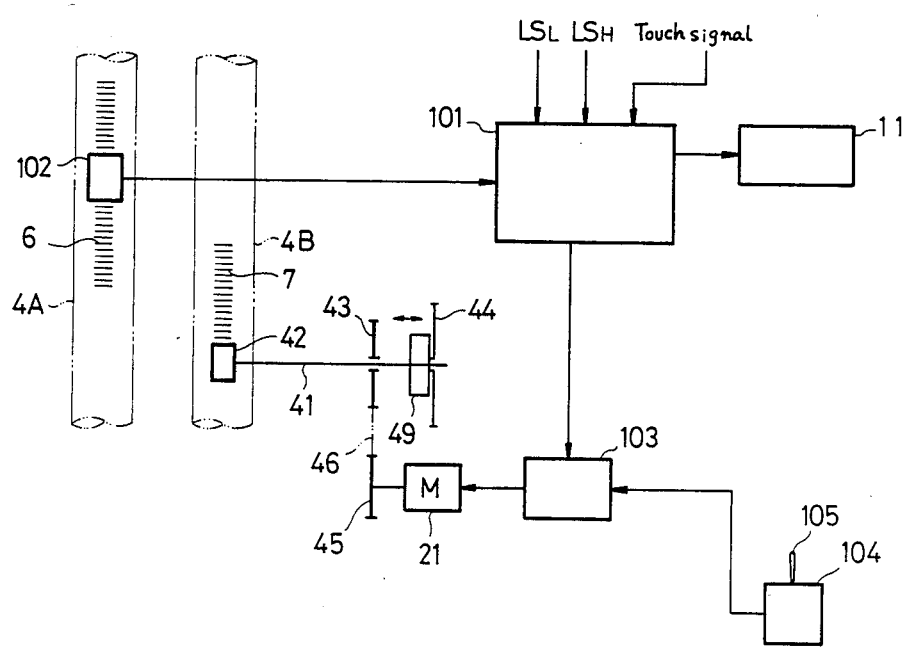

HEIGHT GAUGE

BACKGROUND OF THE INVENTION

1. Field of the Invention

The present invention relates to a height gauge and, more particularly, to a height gauge for use in measuring the dimensions, configuration and so forth of an object such as a work.

2. Description of the Prior Art

Conventional means for vertically moving the slider of a height gauge along a support or supports may be roughly classified into a manual slide type in which the slider is vertically moved by directly gripping the same, and a handle-driven type in which the vertical movement of the slider is not effected by directly gripping the same but is carried out by turning a handle such that a pinion meshed with a rack formed on a support is rotated so as to raise or lower the slider.

The manual slide type involves difficulty in effecting fine adjustment and has the problem that the slider falls along the support when it is freed. In view of these points, the handle-driven type is advantageous: fine adjustment can be effected easily, and the slider can be held stationary at a given position in its travel without providing any special stopper or balancing weight.

However, the handle-driven type still suffers from the disadvantage that considerable labor is required for vertically moving the slider, which leads to an extremely low working efficiency, particularly in a height gauge with a relatively large height.

SUMMARY OF THE INVENTION

It is a primary object of the present invention to provide a height gauge which overcomes the above problems of the prior art and has improved working efficiency and an assured level of safety.

The present invention is accomplished by taking notice of the fact that if the slider of a height gauge can be made stationary when its measuring element or the like comes into registration with an object to be measured, the slider can be arranged so as to be driven automatically, and if it is possible to read off the value measured at that time, an operator can be released from a troublesome operation in which he must simultaneously conduct a drive control operation and a read-off operation, and it thus being possible to obtain practical benefits from the automatic drive of the slider. Thus, according to the present invention, an automatic drive of the slider is introduced into a height gauge while satisfying the above requirements.

More specifically, the present invention provides in a height gauge having a slider vertically movably mounted on a support provided on a base so as to project therefrom vertically, measuring means for detecting the amount of relative movement between the slider and the support, and a digital indicator for digitally indicating a measured value obtained on the basis of an output from the measuring means, an improvement characterized by comprising: a driving system engaged with both the slider and the support for automatically and vertically moving the slider along the support; a detector provided on the slider, the detector including a measuring element tiltable in the longitudinal direction of the support, and the detector generating a signal when the measuring element comes into registration with an object to be measured; and a control circuit which stops the operation of the driving system on the basis of the signal generated by the detector and which holds the indication of a measured value being displayed by the digital indicator at that time.

BRIEF DESCRIPTION OF THE DRAWINGS

The accompanying drawings show in combination one embodiment of the height gauge according to the present invention, in which:

FIG. 6 shows the relationship between a pin and a groove in the driving system;

FIG. 7 is a sectional view taken along the line VII—VII of FIG. 5; and

FIG. 8 is a block diagram of the embodiment.

DETAILED DESCRIPTION OF THE EMBODIMENT

Figure 1:
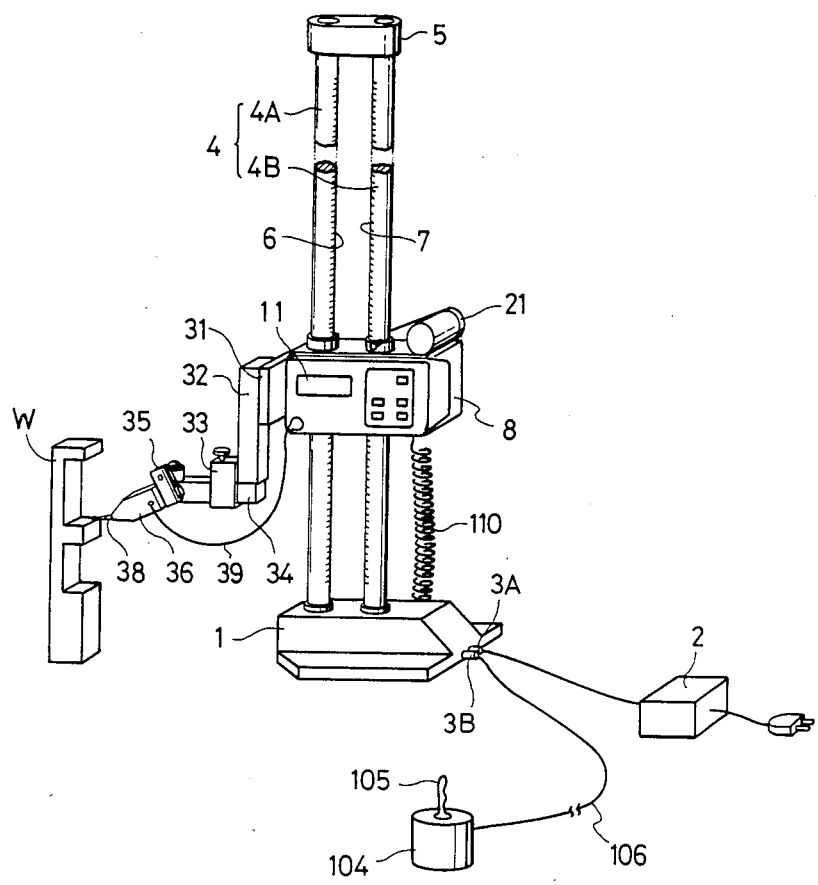
FIG. 1 is a perspective view showing the general arrangement of the embodiment.
Figure 2:
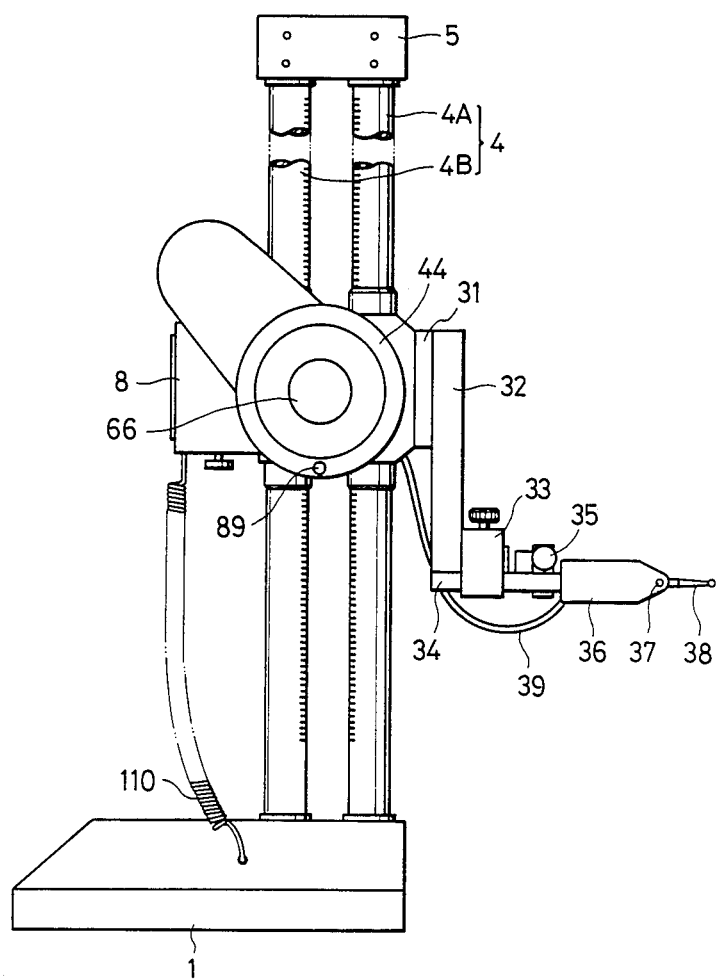
FIG. 2 is a front elevational view of the height gauge main body of the embodiment.
Figure 3:
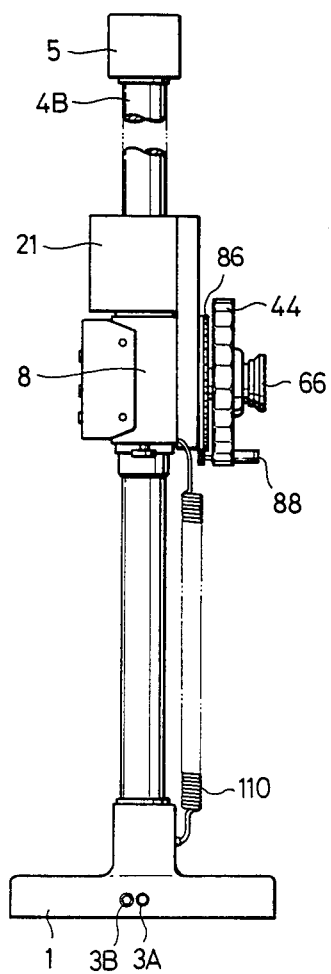
FIG. 3 is a side elevational view of the height gauge main body.
Figure 4:
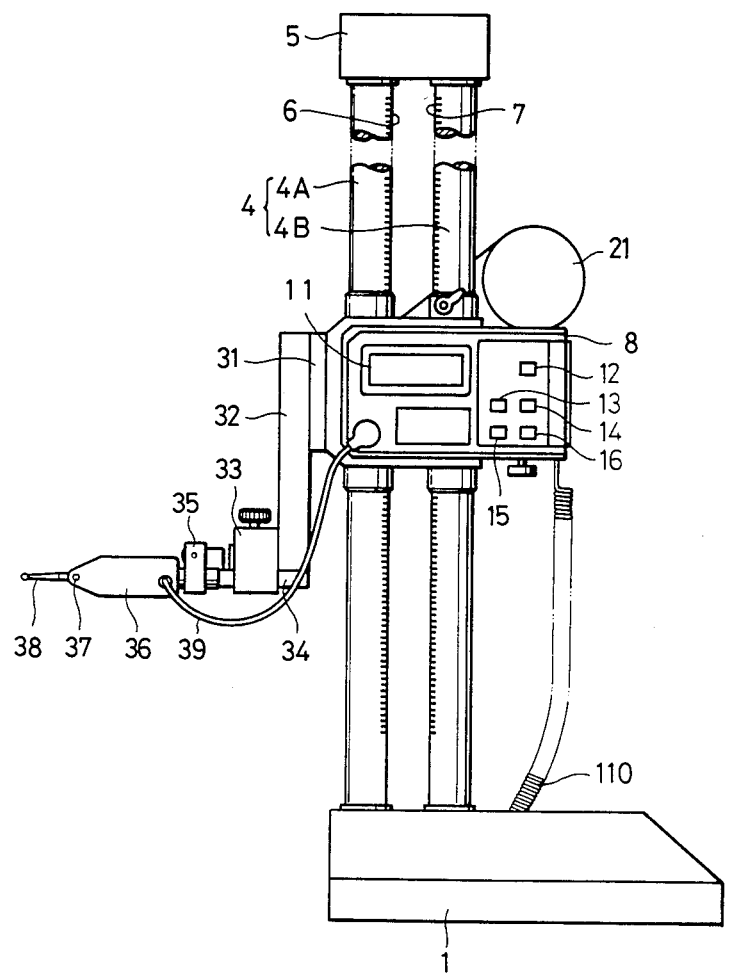
FIG. 4 is a rear view of the height gauge main body.

Referring first to FIGS. 1 to 3, a base 1 is provided on one side surface thereof with a connector 3A to which an AC adaptor 2 is connected and a connector 3B to which a cord 106 led from a joystick 104 is connected. Supports 4 are provided on the base 1 so as to extend vertically from its upper surface. The supports 4 are constituted by a pair of rod members 4A, 4B having a circular cross-section and disposed parallel to each other at a predetermined distance, the respective upper ends of the members 4A, 4B being connected together by a connecting member 5. A scale 6 is provided on the inner surface of the rod member 4A along its longitudinal axis, and a rack 7 is provided on the inner surface of the rod member 4B along its longitudinal axis. A slider 8 is vertically movably mounted between the members 4A, 4B.

The slider 8 is provided on its front surface with a digital indicator 11 for digitally indicating the amount of relative movement between the slider 8 and the supports 4, that is, the amount of heightwise movement of the slider 8, together with a power supply switch 12, a preset digit designating switch 13, a preset register switch 14 for successively presetting numerals from 0 to 9 in the indication digits of the digital indicator 11 designated by the digit designating switch 13, a hold switch 15, and a zero set switch 16. A reversible motor 21 is secured to the upper surface of the slider 8, and an L-shaped support arm 32 is secured through a fixing member 31 to the other side surface of the slider 8.

A slide bar 34 in the shape of a quadrangular prism is provided on the horizontal portion of the support arm 32 through a clamp frame 33 so that the slide bar 34 can be selectively fixed and moved toward and away from the supports 4 in a direction orthogonal to the axes of the rod members 4A, 4B which extend parallel to each other. A touch signal probe 36 which serves as a detector is mounted at the distal end of the slide bar 34 through a clamp mechanism 35 so that it is possible to vary the posture of the probe 36 in the vertical direction. The touch signal probe 36 has a measuring element 38 which is tiltable in the longitudinal direction of the supports 4 about its proximal end 37, that is, pivotal vertically. The probe 36 is arranged such as to generate a touch signal when the measuring element 38 abuts against an object to be measured such as a work W and further pivots a predetermined angle. In this embodiment, a touch signal is output when the measuring element 38 pivots an angle corresponding to the radius of its spherical distal end portion after abutting against the work W. The touch signal from the probe 36 is delivered through a lead wire 39 to a control circuit provided within the slider 8.

Figure 5:
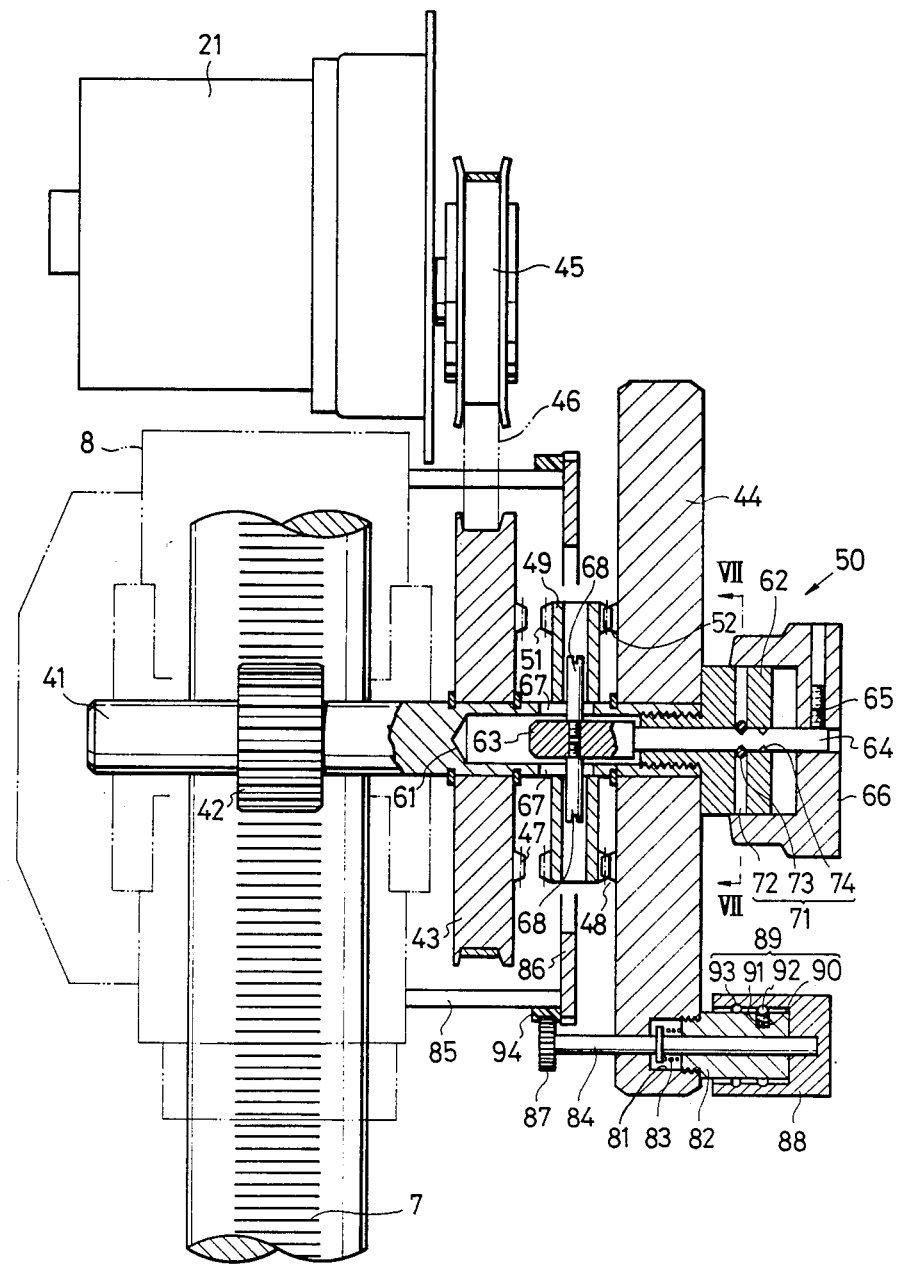
FIG. 5 is a sectional view of an essential portion of the driving system of the embodiment.

As shown in FIG. 5, a driving shaft 41 is rotatably journalled on the slider 8, the shaft 41 extending through the interior of the slider 8 and between the pair of rod members 4A, 4B in a direction orthogonal to the longitudinal axes thereof. The driving shaft 41 has a pinion 42 mounted on a portion thereof located within the slider 8 so that the pinion 42 is meshed with the rack 7 formed on the rod member 4B. A pulley 43 and a control wheel 44 are rotatably mounted, at a predetermined distance, on a portion of the driving shaft 41 which projects out from the rear side of the slider 8. A belt 46 is stretched between the pulley 43 and a pulley 45 mounted on the output shaft of the motor 21. Disk-shaped gears 47, 48 are formed integrally with the respective opposing surfaces of the pulley 43 and the control wheel 44. A clutch member 49 which serves as a shifting member is provided on a portion of the driving shaft 41 between the pulley 43 and the control wheel 44 so that the clutch member 49 can be rotated synchronously with the driving shaft 41 and also shifted along the axis of the driving shaft 41 by a mode interchanging means 50.

Disk-shaped gears 51, 52 are integrally formed along the respective outer peripheries of both end faces of the clutch member 49, the gears 51, 52 corresponding to the disk-shaped gears 47, 48 of the pulley 43 and the control wheel 44, respectively. In a state wherein the gear 52 of the clutch member 49 is meshed with the gear 48 of the control wheel 44, the turning force from the control wheel 44 is transmitted to the driving shaft 41 through the gears 48, 52 and the clutch member 49. When the clutch member 49 is moved leftwardly as viewed in FIG. 5 so that the gear 51 is meshed with the gear 47 of the pulley 43, the turning force from the motor 21 is transmitted to the driving shaft 41 through the pulley 45, the belt 46, the pulley 43, the gears 47, 51 and the clutch member 49. As the driving shaft 41 rotates, the pinion 42 meshed with the rack 7 rotates, and consequently, the slider 8 moves vertically along the supports 4. Thus, a driving system 55 of this embodiment is constituted by the joystick 104, the motor 21, and a transmission mechanism composed of the pulleys 45, 43, the belt 46, the clutch member 49, the driving shaft 41 and the pinion 42.

The mode interchanging means 50 is constituted by a bearing member 62, a movable shaft 64, a mode selecting knob 66 and a pair of pins 68. The bearing member 62 is screwed into the opening end of a hollow portion 61 axially formed through the center of the driving shaft 41, from the outer end face side of the control wheel 44. The movable shaft 64 is received through the center of the bearing member 62 so as to be slidable axially of the member 62 and having at its front or inner end a movable element 63 slidable through the hollow portion 61 in the axial direction of the driving shaft 41. The knob 66 is fixed to the rear or outer end of the movable shaft 64 by a screw 65 and is fitted on the outer periphery of the bearing member 62. The pair of pins 68 are inserted into the clutch member 49 from its outer peripheral surface toward the center thereof so as to pass through a pair of grooves 67, respectively, which are axially formed in the driving shaft 41, thereby connecting together the movable member 63 and the clutch member 49. As shown in FIG. 6, each of the pins 68 is formed into the shape of a round rod with a diameter which is smaller than the width of the groove 67. The pins 68 and the clutch member 49 are connected in a state wherein the pins 68 are movably inserted into the clutch member 49 in the radial direction of the clutch member 49. Accordingly, the clutch member 49 can pivotally move with respect to the driving shaft 41 by an amount corresponding to a clearance equal to the difference between the width of the groove 67 and the outside diameter of the pin 68 and an amount corresponding to the clearance between the clutch member 49 and the pin 68. Therefore, the meshing engagement between the disk-shaped gears 47, 51 or that between the disk-shaped gears 48, 52 can be effected smoothly and reliably.

Between the bearing member 62 and the movable shaft 64 is provided a positioning means 71 for allowing the mode selecting knob 66, that is, the movable shaft 64 to be selectively retained at either of two positions in the axial direction of the driving shaft 41. As shown in FIG. 7, the positioning means 71 is constituted by a U-shaped spring 73 inserted into a retaining groove 72 radially formed in the bearing member 62 so that at least two sides of the spring 73 are positioned within a bore of the member 62 into which the movable shaft 64 is inserted, and a pair of V-shaped engagement grooves 74 which are formed in the movable shaft 64 at respective positions axially spaced away from each other at a predetermined distance and which are selectively retained by the spring 73. Thus, when the front engagement groove 74 is retained by the spring 73, the disk-shaped gear 52 of the clutch member 49 is meshed with the disk-shaped gear 48 of the control wheel 44, while when the rear engagement groove 74 is retained by the spring 73, the disk-shaped gear 51 of the clutch member 49 is meshed with the disk-shaped gear 47 of the pulley 43.

A threaded recess 81 is formed in the outer end surface of the control wheel 44, and a bearing member 82 is screwed into the recess 81. A slide shaft 84 is inserted through the center of the bearing member 82 so as to be slidable in the same direction as the axis of the driving shaft 41, the slide shaft 84 extending through the control wheel 44 and being constantly biased leftwardly in FIG. 5 by the action of a spring 83. A pinion 87 is secured to the front end of the slide shaft 84, the pinion 87 selectively meshing with a gear wheel 86 secured to the slider 8 through a retaining member 85. A knob 88 for use in fine adjustment is secured to the rear end of the slide shaft 84 in such a manner as to cover the outer periphery of the bearing member 82. A positioning mechanism 89 for retaining the slide shaft 84 at either of two positions in the axial direction of the shaft 84 is provided between the inner peripheral surface of the knob 88 and the outer peripheral surface of the bearing member 82.

The positioning mechanism 89 is constituted by a ball 92 which is accommodated in a retaining bore 90 radially formed in the outer periphery of the bearing member 82 and which is constantly biased by a spring 91 in a direction in which the ball 92 projects out from the bore 90, and retaining grooves 93 which are formed in the inner peripheral surface of the knob 88 and at respective positions axially spaced away from each other at a predetermined distance and with which the ball 92 is selectively engaged so as to be retained. Further, a resilient member 94 such as a sponge or rubber material is annularly attached along the outer periphery of the inner surafce of the gear wheel 86 so as to apply a predetermined resistance to the pinion 87. Thus, if the driving shaft 41 is rotated by the power from the motor 21, the control wheel 44 is not rotated but is maintained in a stationary state.

As shown in FIG. 8, the touch signal from the touch signal probe 36 is input to a contol circuit 101, together with signals $LS_L$, $LS_H$ respectively output from limit switches (not shown) which detect an upper-limit position and a lower-limit position, respectively, of the slider 8. The control circuit 101 executes a given processing of the output of an encoder 102 serving as a measuring means which reads off the amount of relative movement between the slider 8 and the supports 4, that is, the amount of movement of the slider 8, from the scale 6 formed on the rod member 4A, the thus measured value then being displayed on the digital indicator 11. While doing so, when any of the signals $LS_L$, $LS_H$ from the limit switches and the touch signal from the probe 36 is input to the contol circuit 101, it gives a stop command to a motor driving circuit 103 so as to stop the motor 21 through the circuit 103 and holds the indication of the measured value being displayed on the digital indicator 11 at this time. When the touch signal which has been delivered from the probe 36 disappears as a result of restarting of the motor 21, the control circuit 101 cancels the above hold. The joystick 104 used for selectively rotating the motor 21 forwardly or backwardly is connected to the motor driving circuit 103. The joystick 104 shows characteristics different from each other in accordance with the direction in which a control lever 105 is tilted. For example, if the arrangement is such that the slider 8 is moved upwardly when the motor 21 is rotated forwardly and the slider 8 is moved downwardly when the motor 21 is rotated backwardly, the joystick 104 is so designed that the rotational speed of the motor 21 at the time when the control lever 105 is tilted in one direction for rotating the motor 21 forwardly is larger than that of the motor 21 at the time when the control lever 105 is tilted in the other direction for rotating the motor 21 backwardly. It is to be noted that each of the above circuits is supplied with a DC voltage converted by the AC adaptor 2 connected to the connector 3A through a spiral flexible cord 110 extending between the base 1 and the slider 8.

The operation of this embodiment will now be described.

First, the mode selecting knob 66 is pushed in leftwardly as viewed in FIG. 5 so that the rear engagement groove 74 of the movable shaft 64 is retained by the spring 73. In consequence, the clutch member 49 is moved leftwardly in FIG. 5 by the movement of the movable shaft 64, thus causing the disk-shaped gear 51 of the clutch member 49 to mesh with the disk-shaped gear 47 of the pulley 43. In this state, the motor 21 is driven by controlling the joystick 104. The turning force from the output shaft of the motor 21 is transmitted to the driving shaft 41 through the pulley 45, the belt 46, the pulley 43, the gears 47, 51 and the clutch member 49. As a result, the pinion 42 secured to the driving shaft 41 rolls along the rack 7 formed on the rod member 4B, and the slider 8 is thereby moved vertically along the supports 4. Accordingly, it is possible for the slider 8 to be speedily and readily raised and lowered.

During the above operation, the rotation of the driving shaft 41 urges the control wheel 44, rotatably supported on the driving shaft 41, so as to rotate in the same direction as the shaft 41. However, since the pinion 87 of the slide shaft 84 extending through the control wheel 44 is maintained in a stationary state by virtue of the resilient member 94, the control wheel 44 cannot be rotated by the rotation of the driving shaft 41.

When the measuring element 38 of the touch signal probe 36 abuts against the work W as a result of the vertical movement of the slider 8 and further pivotally moves a distance corresponding to the radius of the spherical distal end portion of the measuring element 38, a touch signal is generated by the probe 36 and output to the control circuit 101. Thereupon, the control circuit 101 gives a stop command to the motor driving circuit 103 so as to stop the motor 21 through the circuit 103, and at the same time, the control circuit 101 holds the indication of the measured value being displayed on the digital indicator 11, that is, the amount of movement of the slider 8 detected by the encoder 102. Since the operation of the motor 21 is stopped when the measuring element 38 of the touch signal probe 36 abuts against the work W, it is not necessary for the operator to handle the height gauge particularly carefully for fear of any damage to the apparatus due to possible overrun of the motor 21 after the measuring element 38 has abutted against the work W. Although the motor 21 may somewhat overrun, since the measuring element 38 of the probe 36 has a structure which allows some overrun, there is no fear of the apparatus being damaged. Since the indication of the measured value being displayed on the digital indicator 11 at the time when the measuring element 38 abuts against the work W is held, it is possible to release the operator from a troublesome operation in which he must simultaneously conduct a drive control operation and a read-off operation. In addition, the measured value displayed on the digital indicator 11 has already been subjected to correction of an error corresponding to the radius of the spherical distal end portion of the measuring element 38. There is therefore no error occurring in measurement regardless of whether the slider 8 is moved upwardly or downwardly.

Thereafter, the motor 21 is restarted through the motor driving circuit 103 by controlling the joystick 104. When the measuring element 38 of the touch signal probe 36 separates from the work W, the touch signal which has been output from the probe 36 disappears. Thereupon, the control circuit 101 cancels the hold of the indication of the measured value being displayed on the digital indicator 11. Thus, a subsequent measuring operation can be effected without any hindrance.

In this way, measurement is successively carried out. When, during the measurement, the slider 8 reaches either the upper- or lower-limit position on the supports 4, a signal $LS_H$ or $LS_L$ from the corresponding limit switch is supplied to the control circuit 101. In consequence, the motor 21 is stopped through the motor driving circuit 103 in a manner similar to that in the case of the touch signal output from the probe 36. It is therefore possible to carry out a measuring operation safely and without any fear of the apparatus being damaged as a result of possible overrun of the motor 21.

When the mode selecting knob 66 is moved rightwardly in FIG. 5 so that the front engagement groove 74 of the movable shaft 64 is retained by the spring 73, the disk-shaped gear 52 of the clutch member 49 is meshed with the disk-shaped gear 48 of the control wheel 44. In this state, even if the rotation of the motor 21 is transmitted to the pulley 43, the rotation of the pulley 43 is not transmitted to the clutch member 49. There is therefore no possibility of the driving shaft 41 being rotated by the turning force from the motor 21. In other words, in that state, the turning force from the control wheel 44 is transmitted to the driving shaft 41 through the gears 48, 52 and the clutch member 49; hence, it is possible to move the slider 8 vertically along the supports 4 by manually turning the control wheel 44. Accordingly, the operating mode of the apparatus in which the slider 8 is moved vertically can be automatically interchanged between an automatic mode and a manual mode by actuating the mode interchanging means 50.

In the manual mode, the positioning mechanism 89 is switched over so that the pinion 87 is meshed with the gear wheel 86, and then, the fine adjustment knob 88 is turned. In consequence, the pinion 87 turns along the gear wheel 86, thus allowing the control wheel 44 to be turned at low speed. In other words, it is possible to move the slider 8 vertically along the supports 4 little by little.

Since the slider 8 is automatically raised or lowered by the motor 21, it is possible according to this embodiment to reduce the labor required for vertically moving the slider 8 and expect a speedy measuring operation.

In this embodiment, the operation of the motor 21 is stopped on the basis of the touch signal generated from the touch signal probe 36 when the measuring element 38 of the probe 36 contacts the work W as a result of the vertical movement of the slider 8. It is therefore not necessary for the operator to handle the height gauge particularly carefully for fear of any damage to the apparatus due to possible overrun of the motor 21 after the measuring element 38 has abutted against the work W. In addition, since the indication of the measured value being displayed on the digital indicator 11 at the time when the touch signal is generated is held by the operation of the control circuit 101, the operator can be released from the troublesome operation in which he must simultaneously conduct a drive control operation and a read-off operation. Thus, it is possible to effect a speedy and accurate measuring operation.

Even when the slider 8 reaches either the upper- or lower-limit position, the motor 21 is stopped on the basis of a signal delivered from the corresponding limit switch. It is therefore possible to carry out a measuring operation safely and without any damage to the apparatus.

Since the hold of the indication of the measured value is canceled when the motor 21 is restarted in response to a command from the joystick 104, a subsequent measuring operation can be carried out without any hindrance.

The touch signal is generated by the touch signal probe 36 when the measuring element 38 pivots an amount corresponding to the radius of the spherical distal end portion of the measuring element 38 after it has touched the work W regardless of whether the slider 8 is moved upwardly or downwardly, that is, the touch signal is generated in regard to the neutral axis of the measuring element 38 at all times. It is therefore possible to operate the apparatus without any need to change the drive control system, to make correction of data, or to modify the arrangement irrespective of whether the slider 8 is moved upwardly or downwardly.

The turning force from the pulley 43 to which the rotation of the motor 21 is transmitted and the turning force from the control wheel 44 are selectively transmitted to the driving shaft 41 through the clutch member 49 which selectively meshes with the pulley 43 or the control wheel 44. Therefore, the operating mode can be interchanged between an automatic mode and a manual mode by changing the position of the clutch member 49. In addition, the mode interchanging means takes up only a very small space in the axial direction of the driving shaft 41. It is therefore possible to arrange the mode interchanging means relatively simply and in a relatively small size.

The above mode interchanging operation can be effected extremely simply, since it is only necessary to selectively move the mode selecting knob 66 between two positions spaced away from each other in the axial direction of the driving shaft 41. Since the positioning means 71 which retains the movable shaft 64 at either of two positions is provided, there is no possibility of the members meshed with each other at each of the two positions disengaging from each other. Since it is possible for the clutch member 49 to pivot slightly with respect to the driving shaft 41, the mating members can be smoothly and reliably meshed with each other when the operating modes are interchanged.

When the fine adjustment knob 88 is turned, the pinion 87 turns along the gear wheel 86, that is, the control wheel 44 turns at low speed. Accordingly, it is possible to raise or lower the slider 8 little by little. When the pinion 87 is not in engagement with the gear wheel 86, resistance is applied to the pinion 87 by means of the resilient member 94. There is therefore no risk of the control wheel 44 turning even when the driving shaft 41 rotates.

In practice, the encoder may be of the photoelectric type, electrostatic capacity type or electromagnetic type, provided that it can detect the amount of relative movement between the slider 8 and the supports 4.

Although the touch signal probe 36 is exemplified as the detector in the above description, the form of detection is not necessarily limited to one utilizing a touch signal, and a photoelectric detector or non-contact type detector may be employed. In addition, the touch signal probe 36 may be arranged such that when the measuring element 38 touches the work W, relevant contacts are closed by the pivotal movement of the measuring element 38, thereby generating a touch signal. Alternatively, a touch signal may be generated by detecting a predetermined pressure which is applied to the measuring element 38 when abutting against the work W.

Although the hold of the indication of the measured value is cancelled when the touch signal disappears in the above embodiment, the hold may be cancelled when, for example, an automatic feed signal for driving the motor 21 is generated. Further, resetting may be effected by a manual operation.

As has been described above, it is possible according to the present invention to provide a height gauge having improved working efficiency and an assured level of safety.

What is claimed is:

1. In a height gauge having a slider vertically movably mounted on a support provided on a base, measuring means for detecting the amount of relative movement between said slider and said support, and a digital indicator for digitally indicating a measured value obtained on the basis of an output from said measuring means, the improvement comprising:

a driving system engaged with both said slider and said support for automatically and vertically moving said slider along said support, said driving system including a transmission mechanism which comprises a driving shaft rotatably mounted in said slider and having a pinion which engages with a rack formed on said support, said driving shaft being formed thereon with a hollow portion along the central axis thereof and a groove formed in parallel with said hollow portion, a pulley rotatably mounted on said driving shaft, a motor provided on said slider which rotates said pulley by way of a belt, a control wheel rotatably mounted on said driving shaft, and a shifting member which is axially movably provided on said driving shaft between said pulley and said control wheel, said shifting member being rotatable synchronously with said driving shaft;

means for changing said shifting member in its position on said driving shaft so that said shifting member is selectively engaged with said pulley or said control wheel, said means for changing including a changeover knob having a movable element axially movably provided within said hollow portion and a pin extending through said groove so as to interconnect said movable element and said shifting member;

a detector provided on said slider, said detector including a measuring element tiltable in the longitudinal direction of said support, and said detector generating a signal when said measuring element comes into registration with an object to be measured; and a control circuit which stops the operation of said driving system on the basis of the signal generated by said detector and holds the indication of a measured value being displayed by said digital indicator at that time.

2. A height gauge according to claim 1, wherein said control circuit is arranged such as to cancel said hold of indication when said driving system is restarted.

3. A height gauge according to claim 1, wherein said driving system includes a joystick which shows characteristics different from each other in accordance with the direction in which a control lever is tilted, said motor rotated in association with tilting of the control lever of said joystick.

4. A height gauge according to claim 1, wherein gears are circumferentially formed on the respective opposing surfaces of said pulley and said control wheel, said shifting member being formed on both end faces thereof with gears respectively engaging with a selected one of said gears.

5. A height gauge according to claim 1, wherein said means for changing further includes positioning means for selectively retaining said knob at either of two positions spaced away from each other in the axial direction of said driving shaft.

6. A height gauge according to claim 1, wherein the diameter of said pin is smaller than the width of said groove of said driving shaft.

7. A height gauge according to claim 1, wherein said pin and said shifting member are connected together in such a manner that said pin is movably inserted into said shifting member in the radial direction of said shifting member.

8. A height gauge according to claim 5, wherein said positioning means includes two grooves formed in a movable shaft attached to said movable element and movably supported on said driving shaft for movement between said two positions, and a U-shaped spring which is inserted into a groove radially formed in a tubular bearing member for supporting said movable shaft and which is engageable with said two grooves in said movable shaft.

9. A height gauge according to claim 1, wherein said driving system includes means for moving said slider finely or at low speed.

10. A height gauge according to claim 9, wherein said finely moving means includes a gear wheel secured to said slider, and a knob having a further pinion provided so as to be engageable with said gear wheel.

11. A height gauge according to claim 10, wherein the pinion of said knob is in frictional contact with said slider so that said further pinion cannot rotate when said further pinion is not in engagement with said gear wheel.

12. A height gauge according to claim 1, wherein said detector is a touch signal probe which is so designed that the posture thereof is variable.

* * * * *